US012386304B2

(12) United States Patent
Takagi

(10) Patent No.: US 12,386,304 B2
(45) Date of Patent: Aug. 12, 2025

(54) STRUCTURE AND IMAGE FORMING APPARATUS

(71) Applicant: KYOCERA Document Solutions Inc., Osaka (JP)

(72) Inventor: Masaru Takagi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/736,315

(22) Filed: Jun. 6, 2024

(65) Prior Publication Data

US 2024/0411261 A1 Dec. 12, 2024

(30) Foreign Application Priority Data

Jun. 8, 2023 (JP) ................................ 2023-094455

(51) Int. Cl.
*G03G 21/16* (2006.01)

(52) U.S. Cl.
CPC ..... *G03G 21/1619* (2013.01); *G03G 21/1647* (2013.01)

(58) Field of Classification Search
CPC ...................... G03G 21/1619; G03G 21/1647
See application file for complete search history.

(56) References Cited

U.S. PATENT DOCUMENTS

| | | | | |
|---|---|---|---|---|
| 6,259,872 | B1 | 7/2001 | Fukunaga et al. | |
| 2014/0160713 | A1* | 6/2014 | Eguchi | G03G 21/1619 361/807 |
| 2021/0063950 | A1* | 3/2021 | Ishii | G03G 21/1647 |
| 2021/0278781 | A1* | 9/2021 | Takagi | G03G 21/1619 |
| 2021/0333741 | A1* | 10/2021 | Hirahara | G03G 21/1619 |

FOREIGN PATENT DOCUMENTS

| | | |
|---|---|---|
| JP | 2000138470 A | 5/2000 |

* cited by examiner

*Primary Examiner* — Sandra Brase
(74) *Attorney, Agent, or Firm* — Alleman Hall & Tuttle LLP

(57) ABSTRACT

Each of four outer side surfaces of each of a plurality of square pipes includes a groove portion formed along a longitudinal direction of each of the plurality of square pipes, and a pair of ridgeline portions on both sides of the groove portion. An additional member has a contact plane that comes in contact with one or both of the pair of ridgeline portions of each of the plurality of target pipes. A plurality of cantilever portions of the additional member come in contact with only one of the pair of ridgeline portions. An overhang portion of the additional member is formed between two specific cantilever portions of the plurality of cantilever portions, and comes in contact with both of the pair of ridgeline portions of the specific pipe. An edge of each of the plurality of cantilever portions is welded to the groove portion.

5 Claims, 4 Drawing Sheets

STRUCTURE AND IMAGE FORMING APPARATUS

INCORPORATION BY REFERENCE

This application is based upon and claims the benefit of priority from the corresponding Japanese Patent Application No. 2023-094455 filed on Jun. 8, 2023, the entire contents of which are incorporated herein by reference.

BACKGROUND

The present disclosure relates to a structure including a plurality of square pipes joined together, and an image forming apparatus including the structure.

The image forming apparatus includes a sheet feed portion, a printing portion, a developing agent container, and the like. Furthermore, the image forming apparatus includes a structure that supports the sheet feed portion, the printing portion, and the developing agent container.

For example, a structure is known that includes a plurality of square pipes joined by welding. A structure having such a configuration has high strength.

SUMMARY

A structure according to one aspect of the present disclosure has a plurality of joined square pipes and an additional member attached to some of the plurality of square pipes. Four corners of each of the plurality of square pipes include three first corners formed by bending a single metal plate, and one second corner including two edge portions of the metal plate and a weld portion joining the two edge portions. Each of four outer side surfaces of each of the plurality of square pipes includes a groove portion formed along a longitudinal direction of each of the plurality of square pipes, and a pair of ridgeline portions forming edge portions on both sides of the groove portion. The additional member has a contact plane that is a plane that comes in contact with one or both of the pair of ridgeline portions of each of the plurality of target pipes that are some of the plurality of square pipes. Outer edge portions of the additional member include a plurality of cantilever portions and an overhang portion. The plurality of cantilever portions each include a region that comes in contact with only one of the pair of ridgeline portions of each of the plurality of target pipes in the contact plane. The overhang portion is formed between two specific cantilever portions of the plurality of cantilever portions and protrudes farther outward than the two specific cantilever portions, and includes a region in the contact plane that comes in contact with both of the pair of ridgeline portions of a specific pipe that is one of the plurality of target pipes. An edge of each of the plurality of cantilever portions is welded to the groove portion of each of the plurality of target pipes.

An image forming apparatus according to another aspect of the present disclosure includes the structure, and a printing portion attached to the structure and configured to form an image on a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the drawings. Note that the following embodiments are examples of embodying a technique according to the present disclosure, and do not limit the technical scope of the present disclosure.

[Configuration of Image Forming Apparatus 10]

Figure 1:
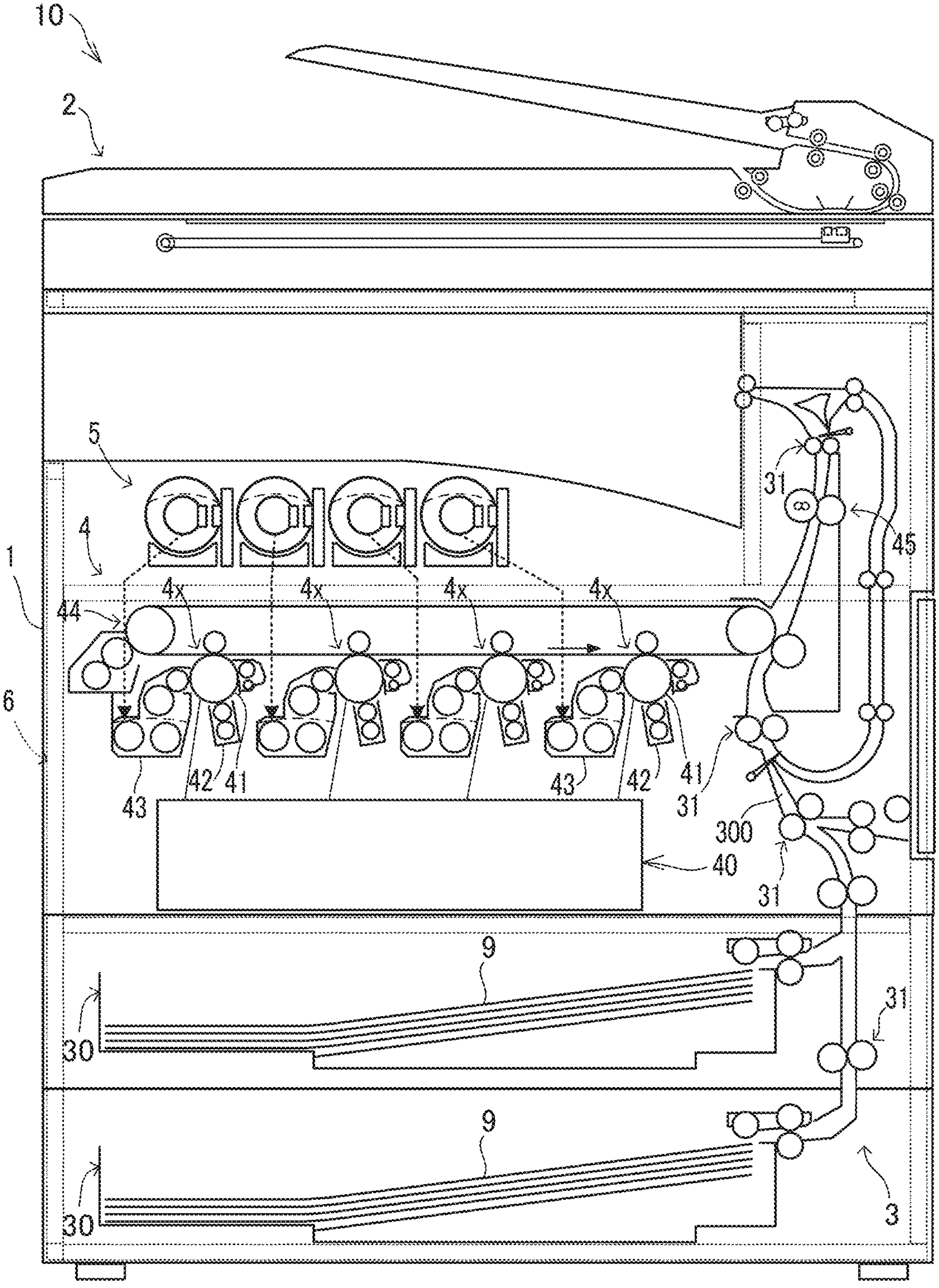
FIG. 1 is a configuration diagram of an image forming apparatus including a structure according to an embodiment.

A structure 6 according to an embodiment is employed in an image forming apparatus 10. As shown in FIG. 1, the image forming apparatus 10 includes a main body unit 1 and an image reading unit 2.

The main body unit 1 includes a sheet feed portion 30, a paper conveying device 3, a printing portion 4, one or more developing agent containers 5, and the structure 6. The image reading unit 2 is connected to an upper portion of the main body unit 1. The image reading unit 2 is a device that reads an image of a document.

The sheet feed portion 30 is a device that stores a plurality of sheets of paper and feeds out the stored sheets one by one to a paper conveying path 300. The paper conveying device 3 includes a plurality of conveying roller pairs 31 that convey the paper along the paper conveying path 300.

The printing portion 4 is a device that forms an image on the paper supplied from the sheet feed portion 30 via the paper conveying device 3. In the example shown in FIG. 1, the printing portion 4 forms an image on the paper using an electrophotographic method. The paper is an example of a sheet.

The electrophotographic printing portion 4 includes a laser scanning unit 40, one or more image forming portions 4*x*, a transfer device 44, and a fixing device 45.

In the example shown in FIG. 1, the printing portion 4 is a tandem type color image printing device. Therefore, the printing portion 4 includes four image forming portions 4*x* corresponding to toners of four colors: yellow, magenta, cyan, and black. Furthermore, the image forming apparatus 10 includes four developing agent containers 5 corresponding to the four image forming portions 4*x*.

In each of the image forming portions 4*x*, a drum-shaped photoconductor 41 rotates, and a charging device 42 charges the outer peripheral surface of the photoconductor 41. Furthermore, a laser scanning unit 40 writes an electrostatic latent image on the outer peripheral surface of the photoconductor 41, and a developing device 43 develops the electrostatic latent image into a toner image.

Furthermore, in the transfer device 44, an intermediate transfer belt rotates while coming in contact with the four photoconductors 41, and four primary transfer devices corresponding to the four image forming portions 4$x$ transfer the toner images to the intermediate transfer belt. Furthermore, a secondary transfer device transfers the toner image on the intermediate transfer belt to the paper being conveyed via the paper conveying path 300.

The fixing device 45 fixes the toner image on the paper by heating and pressing the toner image on the paper. The paper conveying device 3 discharges the paper on which the image is formed from the paper conveying path 300.

Each developing agent container 5 supplies toner to a corresponding developing device 43 in the printing portion 4. The toner is an example of a developing agent. Note that the printing portion 4 may be a device that forms an image on the paper using an inkjet method or another method.

The sheet feed portion 30, the paper conveying device 3, the printing portion 4, and the developing agent containers 5 are attached to the structure 6. The image reading unit 2 is connected to an upper portion of the structure 6.

Figure 2:
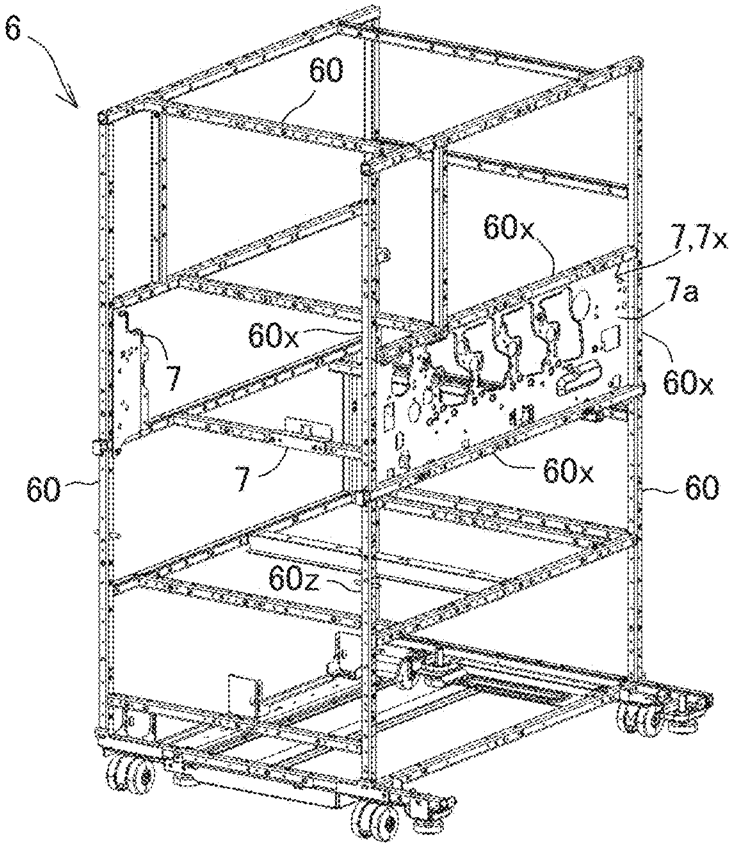
FIG. 2 is a perspective view of a structure according to an embodiment.

The structure 6 includes a plurality of joined square pipes 60 (see FIG. 2). In the structure 6, a plurality of metal square pipes 60 are joined by welding. Such a structure 6 has high strength.

A typical square pipe is manufactured by bending a single metal plate and welding two edge portions of the metal plate together.

On the other hand, one or more additional members 7 may be attached to some of the plurality of square pipes 60 along outer side surfaces of some of the plurality of square pipes 60 (see FIG. 2). In this case, the additional members 7 may be required to be attached with high positional accuracy.

For example, the additional members 7 are sheet metal members manufactured by bending and/or drilling metal plate.

In the present embodiment, the structure 6 includes a plurality of additional members 7 attached to some of the plurality of square pipes 60 (see FIG. 2). The additional members 7 are fixed to a part of the plurality of square pipes 60 by welding or screws.

In a conventional structure, due to insufficient accuracy of an outer surface shape of each of the plurality of conventional square pipes, it was difficult to attach the additional members 7 to some of the plurality of conventional square pipes with high positional accuracy.

In the present embodiment, the structure 6 has a configuration that allows the additional members 7 to be attached to the outer side surfaces of some of the square pipes 60 with high positional accuracy. The configuration will be explained below.

[Configuration of Square Pipes 60]

Figure 3:
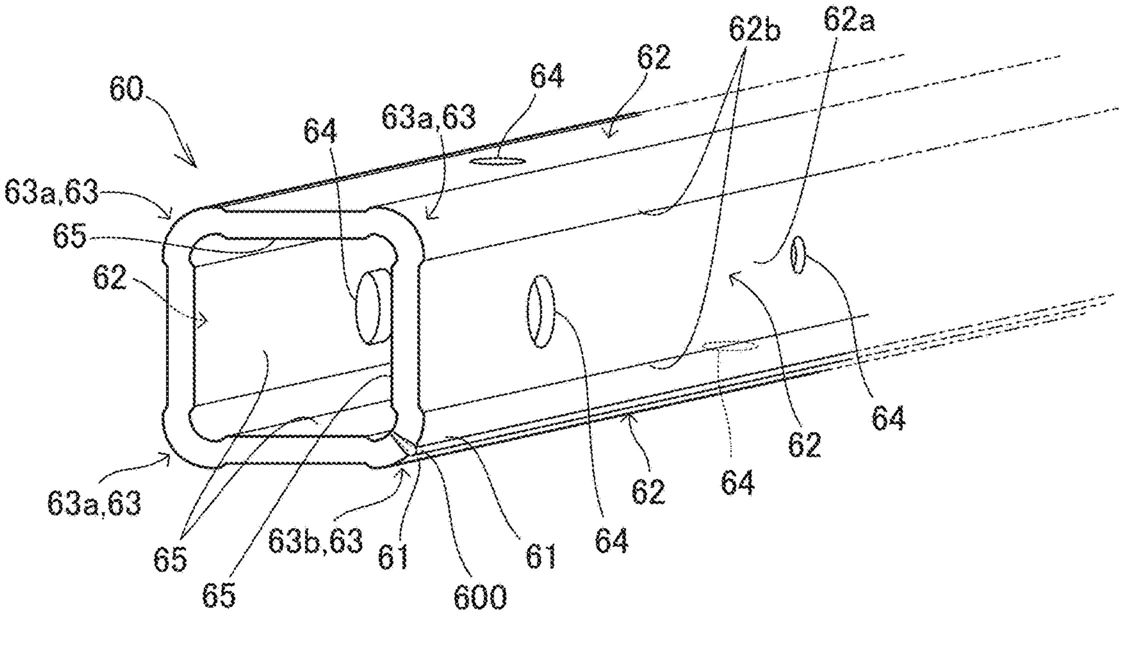
FIG. 3 is a perspective view of one square pipe in a structure according to an embodiment.

Each of the plurality of square pipes 60 has four outer side surfaces 62 and four corners 63 (see FIG. 3). The four outer side surfaces 62 and the four corners 63 are formed to extend in the longitudinal direction of each square pipe 60.

The four corners 63 include three first corner portions 63$a$ and one second corner portion 63$b$. The three first corner portions 63$a$ are three bent portions formed by bending a single metal plate. The second corner portion 63$b$ includes two edge portions 61 of the metal plate and a weld portion 600 that joins the two edge portions 61.

The two edge portions 61 and the weld portion 600 are formed to extend in the longitudinal direction of each square pipe 60.

Each of the square pipes 60 has a plurality of through holes 64 formed in one or more of the four outer side surfaces 62 (see FIG. 3). Processing of the plurality of through holes 64 in the plurality of square pipes 60 is performed on the flat metal plate before bending is performed.

Some or all of the plurality of through holes 64 are used for attaching components. For example, the components are directly attached to one of the outer side surfaces 62 of each square pipe 60 by fixing members such as screws inserted into the through holes 64.

In the present embodiment, the image reading unit 2, paper conveying device 3, and printing portion 4 are attached to the structure 6 by the fixing members inserted into the through holes 64.

Note that two or more of the plurality of square pipes 60 may be the same type of member in order to share components. In this case, in some of the plurality of square pipes 60 of the same type, some of the plurality of through holes 64 may not be used for attaching components.

In each square pipe 60, none of the four outer side surfaces 62 includes a weld portion 600. Therefore, in each of the square pipes 60, it is easy to form one or more through holes 64 in each of the four outer side surfaces 62.

For example, four or more through holes 64 are formed in four outer side surfaces 62 of at least one of the plurality of square pipes 60 (see FIG. 3).

In each of the square pipes 60, two of the four outer side surfaces 62 are formed between the three first corner portions 63$a$. The remaining two of the four outer side surfaces 62 are formed between two of the three first corner portions 63$a$ and the second corner portion 63$b$.

By employing square pipes 60 as shown in FIG. 3 in the structure 6, all four outer side surfaces 62 of each square pipe 60 can be used for attaching parts.

In the present embodiment, the three first corner portions 63$a$ form a chamfered shape (see FIG. 3). In addition, in the second corner portion 63$b$, the two edge portions 61 of the metal plate are bent to form a chamfered shape.

In each of the square pipes 60, the weld portion 600 may be formed to somewhat protrude from the gap between the two edge portions 61. Even in such a case, the two edge portions 61 form a chamfered shape, and thus the weld portion 600 does not interfere with the components attached to each of the two outer side surfaces 62 adjacent to the second corner portion 63$b$.

Figure 4:
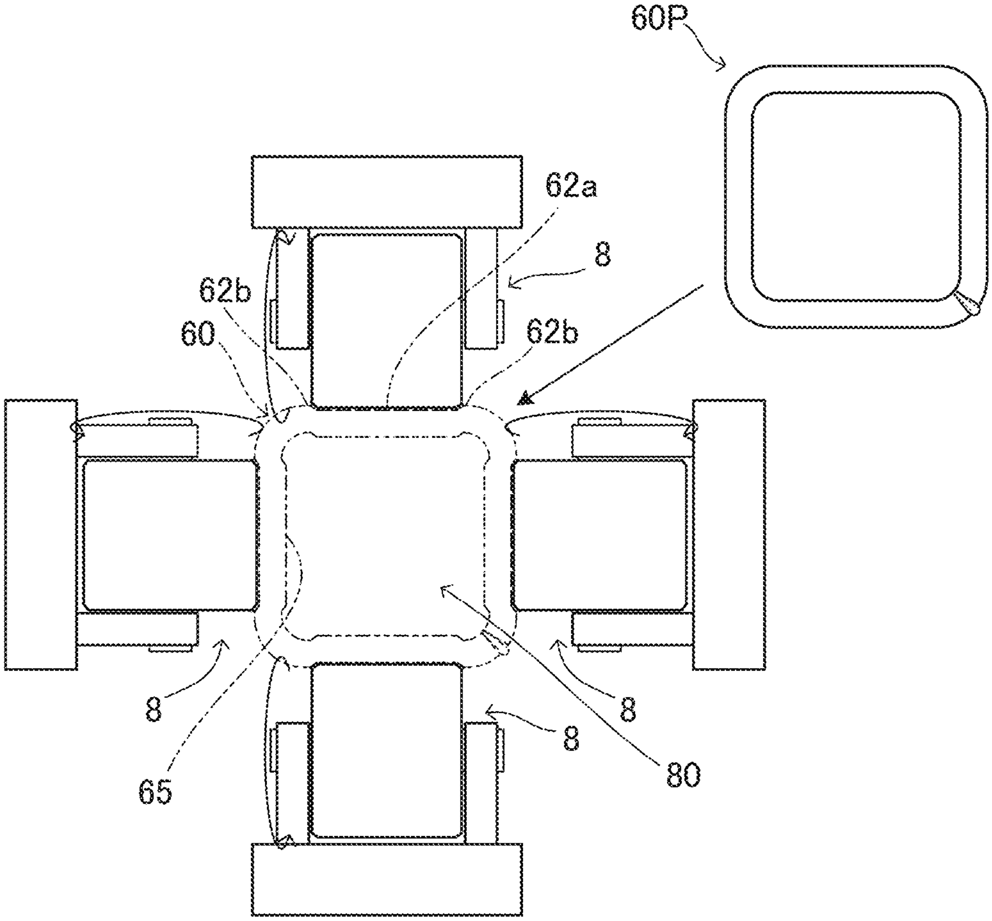
FIG. 4 is a diagram showing a part of a manufacturing process for manufacturing a square pipe in a structure according to an embodiment.

Each of the four outer side surfaces 62 of each of the plurality of square pipes 60 has a groove portion 62$a$ and a pair of ridgeline portions 62$b$ (see FIGS. 3 and 4).

The groove portion 62$a$ is a concave portion formed along the longitudinal direction of each of the plurality of square pipes 60. The pair of ridgeline portions 62$b$ are portions forming the edges on both sides of the groove portion 62$a$. The pair of ridgeline portions 62$b$ are also formed along the longitudinal direction of each of the plurality of square pipes 60.

The pair of ridgeline portions 62$b$ form a pair of crown portions between a pair of step portions and the pair of corner portions 63 on both sides of the groove portion 62$a$. Each of the plurality of square pipes 60 has four groove portions 62$a$ and four pairs of ridgeline portions 62$b$ corresponding to the four outer side surfaces 62.

For example, the step portion between each of the grooves 62$a$ and the pair of ridgeline portions 62$b$ on both sides of each of the grooves 62$a$ is about 0.3 mm to 0.8 mm.

In the following description, the square pipe before the groove portions 62$a$ and the pair of ridgeline portions 62$b$ of each of the four outer side surfaces 62 are formed is referred to as the original square pipe 60P (see FIG. 4).

As shown in FIG. 4, the groove portions 62*a* and the pair of ridgeline portions 62*b* of each of the four outer side surfaces 62 of each of the plurality of square pipes 60 are formed by a roll press in which the original square pipe 60P is passed between four pressure rollers 8.

Two of the four pressure rollers 8 and the remaining two are arranged to face each other via a forming space 80 into which the original square pipe 60P is inserted. The four pressure rollers 8 are each fixed at a predetermined position.

By passing the original square pipe 60P through the forming space 80, the four pressure rollers 8 rotate while being in pressure contact with the four outer side surfaces of the original square pipe 60P. Thus, four groove portions 62*a* corresponding to the surface shapes of the four pressure rollers 8 are formed on the four outer side surfaces of the original square pipe 60P.

In addition, at the same time as the four groove portions 62*a* are being formed, a pair of ridgeline portions 62*b* are formed on both sides of each of the four groove portions 62*a*.

Moreover, when the roll pressing is performed, the inner-side surfaces of the original square pipe 60P are not restrained. Therefore, the four inner-side surfaces 65 of each of the plurality of square pipes 60 are formed so as to protrude inward corresponding to the four groove portions 62*a* (see FIGS. 3 and 4).

Even in a case where the dimensional accuracy of the four outer side surfaces of the original square pipe 60P is not sufficient, the dimensional accuracy of the four groove portions 62*a* and the four pairs of ridgeline portions 62*b* in the square pipe 60 after molding is high.

Figure 5:
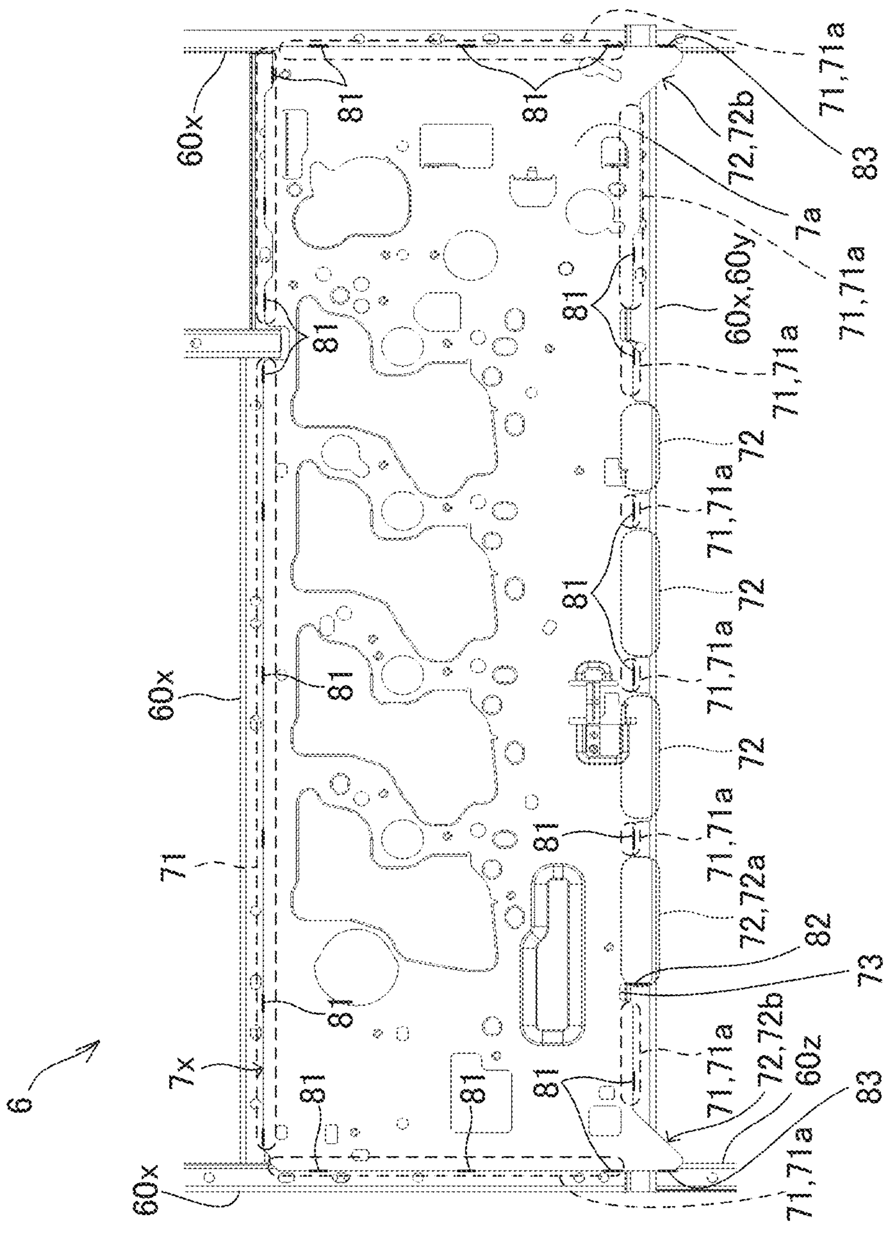
FIG. 5 is a front view of a plurality of target pipes and target additional members in a structure according to an embodiment.

On the other hand, each of the additional members 7 has a contact plane 7*a* that is a plane that comes in contact with a part of the plurality of square pipes 60 of the structure 6 (see FIGS. 2 and 5). Hereinafter, one of the additional members 7 will be referred to as a target additional member 7*x* (see FIGS. 2 and 5).

The plurality of square pipes 60 include a plurality of target pipes 60*x* to which target additional members 7*x* are attached (see FIGS. 2 and 5). The contact plane 7*a* of the target additional member 7*x* is a plane that comes in contact with one or both of the pair of ridgeline portions 62*b* in each of the plurality of target pipes 60*x*.

In the example shown in FIG. 5, the contact plane 7*a* of the target addition member 7*x* comes in contact with one or both of the pair of ridgeline portions 62*b* in each of the four target pipes 60*x*.

In the following description, one of the four target pipes 60*x* will be referred to as a specific pipe 60*y* (see FIG. 5). In the example shown in FIG. 5, the specific pipe 60*y* is arranged along a lower edge portion of the target additional member 7*x*.

An outer edge portion of the target additional member 7*x* includes a plurality of cantilever portions 71 and at least one overhang portion 72 (see FIG. 5). In the example shown in FIG. 5, the outer edge portion of the target additional member 7*x* includes six overhang portions 72.

Each of the plurality of cantilever portions 71 is a portion that includes a region that comes in contact with only one of the pair of ridgeline portions 62*b* of each of the plurality of target pipes 60*x* on the contact plane 7*a* of the target additional member 7*x*.

The edges of each of the plurality of cantilever portions 71 are welded to the groove portions 62*a* of each of the plurality of target pipes 60*x*. The edges of each of the plurality of cantilever portions 71 are welded to the groove portions 62*a* by one or more first weld portions 81. A first weld portion 81 is formed along the longitudinal direction of each target pipe 60*x*.

When the contact plane 7*a* is in contact with at least one of the pair of ridgeline portions 62*b* in each of the plurality of target pipes 60*x*, a slight gap is formed between the target additional member 7*x* and the groove portion 62*a*. There is no particular problem in welding two members in a case where the members are placed with a gap of about 0.3 mm to 0.8 mm between them.

On the other hand, each of the overhang portions 72 is formed between two specific cantilever portions 71*a* of the plurality of cantilever portions 71 so as to protrude further outward than the two specific cantilever portions 71*a*. Each of the overhang portions 72 is a portion including a region that comes in contact with both of the pair of the ridgeline portions 62*b* of the specific pipe 60*y* on the contact plane 7*a* of the target additional member 7*x*.

Two specific cantilever portions 71*a* on both sides of each overhang portions 72 are fixed by the first weld portions 81. Thus, even when each of the overhang portions 72 is not fixed to the specific pipe 60*y*, the target additional member 7*x* is firmly fixed to the plurality of target pipes 60*x*.

In the present embodiment, an edge of a first overhang portion 72*a*, which is one of the plurality of overhang portions 72, is welded to the groove portion 62*a* of the specific pipe 60*y* by the second weld portion 82. The second weld portion 82 is formed along a direction intersecting the pair of ridgeline portions 62*b* of the specific pipe 60*y*.

In a case where the first overhang portion 72*a* and the two specific cantilever portions 71*a* on both sides of the first overhang portion 72*a* are welded to the specific pipe 60*y*, the first weld portion 81 and the second weld portion 82 are formed relatively close to each other. In this case, there is a possibility that a relatively large stress will be applied to the first overhang portion 72*a* due to a dimensional error in the height of the pair of ridgeline portions 62*b* of the specific pipe 60*y*.

Therefore, the target additional member 7*x* has a notch 73 formed between the first overhang portion 72*a* and one of the two specific cantilever portions 71*a* on both sides of the first overhang portion 72*a* The notch 73 is formed to be recessed inward of the target additional member 7*x* to a position where the pair of ridgeline portions 62*b* of the specific pipe 60*y* are exposed.

That is, a portion of the outer edge portion of the target additional member 7*x* between the first overhang portion 72*a* and one of the two specific cantilever portions 71*a* on both sides of the first overhang portion 72*a* does not come in contact with the specific pipe 60*y*.

Fixing the first overhang portion 72*a* by the second weld portion 82 is suitable when it is necessary to fix the target additional member 7*x* more firmly. The notch 73 has an effect of relieving stress applied to the first overhang portion 72*a* fixed by the second welding portion 82.

In the present embodiment, the plurality of overhang portions 72 include one or more second overhang portions 72*b* formed to extend to the position of an adjacent pipe 60*z* adjacent to the specific pipe 60*y*. The adjacent pipe 60*z* is one of the plurality of square pipes 60 other than the plurality of target pipes 60*x*. In the example shown in FIG. 5, the plurality of overhang portions 72 include two second overhang portions 72*b*.

The contact plane 7*a* of each second overhang portion 72*b* comes in contact with both of the pair of ridgeline portions 62*b* of the specific pipe 60*y* and one of the pair of ridgeline portions 62*b* of the adjacent pipe 60*z*.

The edge of each of the second overhang portions 72*b* is welded to the groove portion 62*a* of the adjacent pipe 60*z* by a third weld portion 83. The third weld portion 83 is formed along the longitudinal direction of the adjacent pipe 60*z*.

The third weld portion 83 is formed at a position sufficiently spaced from the second weld portion 82 formed on the two specific cantilever portions 71*a* on both sides of each of the second overhang portions 72*b*. Therefore, the stress applied to the second overhang portion 72*b* due to a dimensional error in the heights of the pair of ridgeline portions 62*b* of the specific pipe 60*y* and the adjacent pipe 60*z* is not large.

Note that a notch 73 may be formed between each of the second overhang portions 72*b* and one of the two specific cantilever portions 71*a* on both sides of each of the second overhang portions 72*b*.

In the present embodiment, of the plurality of overhang portions 72, the portions other than the first overhang portions 72*a* and the second overhang portions 72*b* are not welded to any of the plurality of square pipes 60.

The target additional member 7*x* is positioned with high accuracy in a state where the contact plane 7*a* of the target additional member 7*x* is in contact with one or both of the pair of ridgeline portions 62*b* of each of the plurality of target pipes 60*x*.

By employing the structure 6, it is possible to weld the target additional member 7*x* to the outer side surfaces 62 of the plurality of target pipes 60*x* with high positional accuracy.

SUPPLEMENTARY NOTES

Hereinafter, a summary of the disclosure extracted from the above-described embodiments will be added. Note that each configuration and each processing function described in the following supplementary notes can be selected and combined as desired.

Supplementary Note 1

A structure including a plurality of joined square pipes and an additional member attached to some of the plurality of square pipes, wherein four corners of each of the plurality of square pipes include three first corners formed by bending a single metal plate, and one second corner including two edge portions of the metal plate and a weld portion joining the two edge portions;

each of four outer side surfaces of each of the plurality of square pipes includes a groove portion formed along a longitudinal direction of each of the plurality of square pipes, and a pair of ridgeline portions forming edge portions on both sides of the groove portion;

the additional member has a contact plane that is a plane that comes in contact with one or both of the pair of ridgeline portions of each of the plurality of target pipes that are some of the plurality of square pipes;

outer edge portions of the additional member include a plurality of cantilever portions, each including a region that comes in contact with only one of the pair of ridgeline portions of each of the plurality of target pipes in the contact plane, and an overhang portion formed between two specific cantilever portions of the plurality of cantilever portions and protruding farther outward than the two specific cantilever portions, and including a region in the contact plane that comes in contact with both of the pair of ridgeline portions of a specific pipe that is one of the plurality of target pipes; and an edge of each of the plurality of cantilever portions is welded to the groove portion of each of the plurality of target pipes.

Supplementary Note 2

The structure according to supplementary note 1, wherein an edge of the overhang portion of the additional member is welded to the groove portion of the specific pipe, and the additional member has a notch formed to be recessed inward between the overhang portion and one of the two specific cantilever portions on both sides of the overhang portion to a position where the pair of ridgeline portions of the specific pipe are exposed.

Supplementary Note 3

The structure according to supplementary note 1, wherein the contact plane of the overhang portion of the additional member comes in contact with the pair of ridgeline portions of the specific pipe and one of the pair of ridgeline portions of an adjacent pipe adjacent to the specific pipe of the plurality of square pipes, and an edge of the overhang portion is welded to the groove portion of the adjacent pipe.

Supplementary Note 4

The structure according to any one of supplementary notes 1 to 3, wherein the groove portion and the pair of ridgeline portions on each of the four outer side surfaces of each of the plurality of square pipes are formed by a roll press in which an original square pipe before the groove portion and the pair of ridgeline portions of each of the four outer side surfaces are formed is passed between four pressure rollers that press against four outer side surfaces of the original square pipe.

Supplementary Note 5

An image forming apparatus including the structure described in any one of supplementary notes 1 to 4, and a printing portion attached to the structure and configured to form an image on a sheet.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A structure comprising a plurality of joined square pipes and an additional member attached to some of the plurality of square pipes, wherein four corners of each of the plurality of square pipes comprise three first corners formed by bending a single metal plate, and one second corner including two edge portions of the metal plate and a weld portion joining the two edge portions;

each of four outer side surfaces of each of the plurality of square pipes includes a groove portion formed along a longitudinal direction of each of the plurality of square pipes, and a pair of ridgeline portions forming edge portions on both sides of the groove portion;

the additional member has a contact plane that is a plane that comes in contact with one or both of the pair of ridgeline portions of each of the plurality of target pipes that are some of the plurality of square pipes;

outer edge portions of the additional member include a plurality of cantilever portions, each including a region that comes in contact with only one of the pair of ridgeline portions of each of the plurality of target pipes in the contact plane, and an overhang portion formed between two specific cantilever portions of the plurality of cantilever portions and protruding farther outward than the two specific cantilever portions, and including a region in the contact plane that comes in contact with both of the pair of ridgeline portions of a specific pipe that is one of the plurality of target pipes; and an edge of each of the plurality of cantilever portions is welded to the groove portion of each of the plurality of target pipes.

2. The structure according to claim 1, wherein an edge of the overhang portion of the additional member is welded to the groove portion of the specific pipe, and the additional member has a notch formed to be recessed inward between the overhang portion and one of the two specific cantilever portions on both sides of the overhang portion to a position where the pair of ridgeline portions of the specific pipe are exposed.

3. The structure according to claim 1, wherein the contact plane of the overhang portion of the additional member comes in contact with the pair of ridgeline portions of the specific pipe and one of the pair of ridgeline portions of an adjacent pipe adjacent to the specific pipe of the plurality of square pipes, and an edge of the overhang portion is welded to the groove portion of the adjacent pipe.

4. The structure according to claim 1, wherein the groove portion and the pair of ridgeline portions on each of the four outer side surfaces of each of the plurality of square pipes are formed by a roll press in which an original square pipe before the groove portion and the pair of ridgeline portions of each of the four outer side surfaces are formed is passed between four pressure rollers that press against four outer side surfaces of the original square pipe.

5. An image forming apparatus, comprising the structure according to claim 1, and a printing portion attached to the structure and configured to form an image on a sheet.

* * * * *